United States Patent
Takayama et al.

[11] 4,019,934
[45] Apr. 26, 1977

[54] INORGANIC GEL-AMMONIUM NITRATE COMPOSITE MATERIAL AND METHOD OF MANUFACTURING THE SAME

[76] Inventors: Taro Takayama, No. 10-27, 2-chome, Komazawa, Setagaya, Tokyo; Eiya Kakegawa, Otsu 17, Honmachi, Komoro, Nagano, both of Japan

[22] Filed: Mar. 30, 1972

[21] Appl. No.: 239,707

[52] U.S. Cl. .................................. 149/43; 149/46
[51] Int. Cl.² ..................................... C06B 33/04
[58] Field of Search ............ 71/59, 64 C; 423/396; 252/317; 149/46, 43

[56] References Cited
UNITED STATES PATENTS

| | | | |
|---|---|---|---|
| 2,943,982 | 7/1960 | Dahlin | 71/64 C X |
| 3,179,496 | 4/1965 | Skinner | 71/41 X |
| 3,234,004 | 2/1966 | Smith et al. | 71/28 |
| 3,234,005 | 2/1966 | Swalter | 71/29 X |
| 3,282,752 | 11/1966 | Clay et al. | 149/46 X |
| 3,346,429 | 10/1967 | McMahon | 149/46 X |
| 3,409,486 | 11/1968 | Partridge | 149/46 X |
| 3,496,040 | 2/1970 | Partridge | 149/46 X |

Primary Examiner—Frank A. Spear, Jr.
Assistant Examiner—Ferris H. Lander
Attorney, Agent, or Firm—Kane, Dalsimer, Kane, Sullivan and Kurucz

[57] ABSTRACT

An inorganic gel-ammonium nitrate composite material useful as explosives is disclosed which comprises a mixture of ammonium nitrate and a purified and swollen inorganic gel of montmorillonite.

4 Claims, No Drawings

INORGANIC GEL-AMMONIUM NITRATE COMPOSITE MATERIAL AND METHOD OF MANUFACTURING THE SAME

The present invention relates to an inorganic gel-ammonium nitrate composite material comprising a mixture of ammonium nitrate and the purified and swollen inorganic gel of a clay having swelling property and ion-exchange faculty, such as montmorillonite, vermiculite, hydrated halloysite, and the like. The invention further relates to a method of manufacturing such an inorganic gel-ammonium nitrate composite material.

The purified and swollen inorganic gel prepared from a clay such as montmorillonite group, vermiculite, hydrated halloysite, etc., by the manner described hereinafter contains free water, bound water, and water of crystallization and when the inorganic gel is mixed with ammonium nitrate, the ammonium nitrate is dissolved in the water, replaced with the water, and recrystallized for 100~200 hrs at room-temperature with the particles of the inorganic swollen gel as the nuclei or seeds (such a recrystallization is hereinafter called "ripening" in the specification) to provide the inorganic gel-ammonium nitrate composite material or this invention including sharp edged crystals.

The inorganic gel-ammonium nitrate composite material of this invention has new properties different from the individual properties of the gel of the aforesaid clay and ammonium nitrate and may be used in various field according to the newly found properties.

For example, ammonium nitrate itself shows explosive property but when such an ammonium nitrate is formed into the composite material as mentioned above, the product itself does not show explosive property except the below-mentioning case of compounding the composite material with an aluminum powder and the like. That is, a new state of ammonium nitrate as the composite material is obtained or a stable slurry of a new state of ammonium nitrate is obtained.

The inorganic gel-ammonium nitrate composite material of this invention can be used in various fields, for example, as raw materials for slurry explosives, durable fertilizers, denaturing materials for soil of the bottom of a fishpond, and fertilizers for cultivating seaweeds.

The inorganic gel-ammonium nitrate composite material may be prepared by the following manner.

A pulverized raw clay such as montmorillonite group, vermiculite, hydrated halloysite, etc., is washed with water to remove the greater part of sands contained in it and then the mixture of the clay and water is placed in a tank. The aqueous mixture is then sieved through a 300 mesh-sieve using a vibration shifter and the mixture passed through the sieve is further placed in a tank to provide a clay sol. Thereafter, the clay sol is boiled and concentrated by heating, whereby the clay is sufficiently swollen to provide the purified and swollen inorganic gel of the clay.

The inorganic swollen gel prepared above is mixed with ammonium nitrate and the mixture is mechanically kneaded by means of a kneader or a grinding mixer. It is more preferable, however, to add the inorganic swollen gel to a hot concentrated solution of ammonium nitrate withdrawn from the ammonium nitrate solution to be sent to an ammonium nitrate crystallizer during the production of ammonium nitrate followed by stirring the mixture uniformly. Thus, the inorganic gel-ammonium nitrate composite material of this invention can be prepared most economically.

The amount of ammonium nitrate depends upon the purposes of the product. It is important as mentioned before to ripen the mixture and in particular, in case of using the inorganic gel-ammonium nitrate mixture as a raw material for explosives, the explosive power of the explosives prepared from the mixture can be increased by conducting the ripening procedure sufficiently.

The invention will be explained more practically by the following examples.

a. The Use as the Raw Materials for Slurry Explosives

| | | |
|---|---|---|
| Explosive 1: | | |
| Inorganic gel-ammonium nitrate composite material | | 9 parts |
|     Ammonium nitrate | 7 parts | |
|     Inorganic swollen gel | 2 parts | |
| Aluminum powder | | 1 part |
| Rate of explosion: 4,000–4,800 meters/sec. | | |
| (measured by Dautriche method) | | |
| Explosive 2: | | |
| Inorganic gel-ammonium nitrate composite material | | 8.5 parts |
|     Ammonium nitrate | 8.5 parts | |
|     Inorganic swollen gel | 1.5 parts | |
| Aluminum powder | | 1.5 parts |
| Rate of explosion: 5,000–5,500 meters/sec. | | |
| Explosive 3: | | |
| Inorganic gel-ammonium nitrate composite material | | 9 parts |
|     Ammonium nitrate | 7 parts | |
|     Inorganic swollen gel | 2 parts | |
|     Activated carbon | 0.5 part | |
| Aluminum powder | | 1 part |
| Rate of explosion: 4,300–4,700 meters/sec. | | |
| Explosive 4: | | |
| Inorganic gel-ammonium nitrate composite material | | 9 parts |
|     Ammonium nitrate | 7 parts | |
|     Inorganic swollen gel | 2 parts | |
|     Silica aerogel or silica gel powder | 1 part | |
| Aluminum powder | | 1 part |
| Rate of explosion: 4,500–4,900 meters/sec. | | |

The compositions of the inorganic gel-ammonium nitrate materials of this invention and the compositions of the explosives shown in the above examples are typical ones and the explosive power of the explosives can be controlled desirably by varying the composition of the composite material of this invention and the compounding ratio of the composite material and aluminum powder, which is a feature of this invention.

The inorganic gel-ammonium nitrate composite material of this invention used as the raw material for explosives is quite stable at the preparation and transportation thereof owing to the large content of water and the composite material shows first explosive property when it is mixed with about 10% aluminum powder or the like and a blasting cap or a booster is set on the mixture on the spot of requiring a blasting operation.

One of the features of the slurry explosives prepared by using the inorganic gel-ammonium nitrate composite material of this invention is that because the gel component of the explosive is an inorganic gel, the wave of detonation is well propagated different from the case of employing an organic gel such as guhr gum and also because in the Explosive 2, 3, or 4 shown above air is firmly retained in the fine holes or capilaries and thus hardly escape therefrom, the deterioration of the explosive caused by the escape of air as in a conventional dynamite can be prevented.

Other feature of explosives is that because the inorganic gel-ammonium nitrate composite material of this invention has tixotropic property, the explosive shows fluodity when it is pressed in an explosive charging hole by means of a pressure pump but recovers its viscosity when the pressure is released, which makes it facilitate to charge the explosive in desired holes as well as to conduct blasting works under water or under sea.

b. The Use as Durable Fertilizers

The ammonium nitrate of the inorganic gel-ammonium nitrate composite material of this invention present therein a proportion of 30–50% by weight to the purified and swollen inorganic gel shows improved durability as fertilizers.

That is, when the inorganic gel-ammonium nitrate composite material of this invention is used as a fertilizer, the ammonium nitrate present in the composite material is decomposed by bacteria in soil into ammonia and nitric acid and the ammonia is released gradually in the soil as it is or as the compounds with organic acids or inorganic acids in the soil, while the nitric acid is also released in the soil as bases with the ion-exhange metal ions present in the clay itself, such as $Na^+$, $K^+$, $Mg^{++}$, $Ca^{++}$, $Al^{++}$, etc. Therefore, even when the inorganic gel-ammonium nitrate composite material of this invention is applied to such soil as sandy soil and volcanic ashy soil, it gives a durable effect as fertilizer by the aforesaid phenomenon together with the water retaining property of the clay itself. Moreover, the inorganic gel-ammonium nitrate composite material of this invention is also effective as a neutralizing agent for acid soil since the purified and swollen inorganic gel contained in the composite material has a pH of 7–8.5 by the above-mentioned metal ions present therein.

c. The Use as Denaturing Materials for Soil at the Bottom of Fishpond

A fishpond becomes generally a poor nutritious pond when the pond is used for a long period of time or under other conditions. That is, the content of planktons in the water of the pond or in the soil at the bottom of the pond is reduced by the above reasons. Thus, the culturing efficiency for, for example, crucian carps eating mainly the planktons in the water and carps eating mainly the planktons in the soil is reduced in such case. On the other hand, such a poor fishpond can recover its nutritious effect by using the inorganic gel-ammonium nitrate composite material of this invention containing 20–40% by weight ammonium nitrate since it provides gradually the effective fertilizer components for a long period of time as mentioned above without giving poisonous effect. Thus, by the application of the inorganic gel-ammonium nitrate composite material of this invention, the soil of such a poor pond can be improved effectively and thus the pond is enriched with nutrients.

d. The Use as Fertilizers for Cultivating Seaweeds

Hemp ropes planted with agar and the like have usually been used for cultivating useful seaweeds and such useful natural seaweeds can be obtained by pulling up the ropes at the harvest season. Now, by applying to the bundles of such hemp ropes the inorganic gel-ammonium composite material of this invention containing 20–50% by weight ammonium nitrate, the harvest of the seaweeds can be effectively increased.

What is claimed is:

1. An inorganic gel-ammonium nitrate explosive composite material consisting essentially of an aluminum powder and a ripened mixture of ammonium nitrate and a purified and swollen inorganic gel.

2. The inorganic gel-ammonium nitrate composite material as claimed in claim 1 wherein the content of said ammonium nitrate is 20–50% by weight.

3. The inorganic gel-ammonium nitrate composite material as claimed in claim 1 wherein the inorganic gel is prepared from a clay.

4. The inorganic gel-ammonium nitrate composite material as claimed in claim 1 wherein said inorganic gel is prepared from a material selected from the group consisting of hydrated halloysite and montmorillonite.

* * * * *